United States Patent
Ishida et al.

(10) Patent No.: US 6,294,856 B1
(45) Date of Patent: Sep. 25, 2001

(54) FEEDER ARRANGEMENT OF VEHICLE AC GENERATOR

(75) Inventors: Hiroshi Ishida, Anjo; Tsutomu Shiga, Nukata-gun; Mamoru Toda, Chita-gun, all of (JP)

(73) Assignee: Denso Corporation, Aichi-pref (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,262

(22) Filed: Sep. 30, 1999

(30) Foreign Application Priority Data

Nov. 2, 1998 (JP) .................................................. 10-312324

(51) Int. Cl.$^7$ ..................................................... H01R 39/08
(52) U.S. Cl. ............................ 310/232; 310/239; 310/71
(58) Field of Search .............................. 310/232, 239, 310/71, 88, 89, 91, 58

(56) References Cited

U.S. PATENT DOCUMENTS

| | | | | |
|---|---|---|---|---|
| 3,731,126 | * | 5/1973 | Hagenlocher et al. ............ | 310/68 R |
| 4,293,788 | * | 10/1981 | Binder .................................. | 310/227 |
| 4,311,935 | * | 1/1982 | Hoyss .................................. | 310/227 |
| 4,387,314 | * | 6/1983 | Iwaki et al. ............................. | 310/88 |
| 4,476,410 | * | 10/1984 | Wolcott ................................ | 310/228 |
| 4,499,390 | * | 2/1985 | Iwaki et al. ............................. | 310/88 |
| 4,680,495 | * | 7/1987 | Chiampas et al. ................... | 310/220 |
| 4,705,983 | * | 11/1987 | Franz et al. ......................... | 310/68 D |
| 4,730,135 | * | 3/1988 | Dolderer et al. ................... | 310/68 D |
| 4,959,576 | | 9/1990 | Horibe et al. . | |
| 5,227,688 | * | 7/1993 | Gotoh .................................. | 310/239 |
| 5,345,132 | * | 9/1994 | Sasaki et al. ........................ | 310/239 |

FOREIGN PATENT DOCUMENTS

| | | |
|---|---|---|
| 58172960 | 10/1983 | (JP) . |
| 60002051 | 1/1985 | (JP) . |
| 01138952 | 5/1989 | (JP) . |

* cited by examiner

Primary Examiner—Joseph Waks
(74) Attorney, Agent, or Firm—Pillsbury Winthrop LLP Intellectual Property

(57) ABSTRACT

A feeder arrangement of an AC generator includes slip rings, brushes, a brush holder in which an air chamber is formed, and a slip-ring cover. A partition member is disposed in the air chamber to divide the air chamber to form a U-shaped air passage having an air passage connecting to the outside of the slip-ring cover and an air outlet passage connecting to the inside of the slip-ring cover, so that air flows through the U-shaped air passage to remove worn powder of the brushes from the slip rings.

11 Claims, 7 Drawing Sheets

FEEDER ARRANGEMENT OF VEHICLE AC GENERATOR

CROSS REFERENCE TO RELATED APPLICATION

The present application is based on and claims priority from Japanese Patent Application Hei 10-312324, filed on Nov. 2, 1998, the contents of which are incorporated herein by reference.

BACKGROUND OF THE INVENTION

1. Field of the Invention

The present invention relates to an AC generator for a vehicle and, particularly a feeder arrangement of such an AC generator.

2. Description of the Related Art

In a vehicle AC generator, air is introduced to the contact surface of slip rings with brushes to prevent water, dust or foreign particles from clinging to the contact surface.

JP-B2 4-79224 discloses a feeder arrangement having a brush holder, a cylindrical slip-ring cover, a rubber seal-member which is provided with an air passage open to the contact surface, and a rear cover. The open end of the slip-ring cover is closed by the rubber seal member and the rear cover. However, it is difficult to close the slip-ring cover by the rubber seal member and the rear cover completely because of variation in sizes of the rear cover and the slip-ring cover.

SUMMARY OF THE INVENTION

The main object of the present invention is to provide an improved feeder arrangement of a vehicle AC generator.

Another object of the invention is to provide a feeder arrangement having an improved air passage connecting to the contact surface of the slip-ring with the brush.

Another object of the invention is to provide a feeder arrangement which is easy to manufacture.

According to a main feature of the invention, the improved air passage of the feeder arrangement is formed between a brush holder and a slip-ring cover. A partition member extends from the slip-ring cover and is inserted in an air chamber of the brush holder, forming a U-shaped air passage having an air outlet portion connecting to the outside of the brush holder and an air inlet portion connecting to the inside of the brush holder. The slip-ring cover preferably has a cylindrical portion enclosing the slip rings, and the partition member extends from the rear end of slip-ring cover. Preferably, the air outlet portion of the inside of the slip ring cover is narrower than the air inlet portion on the outside of the slip ring cover to interrupt water or foreign particles effectively. More specifically, the partition member may have a labyrinth in the air passage. The brush holder may have a tongue at an axial end thereof to shut off water or other foreign particles effectively.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
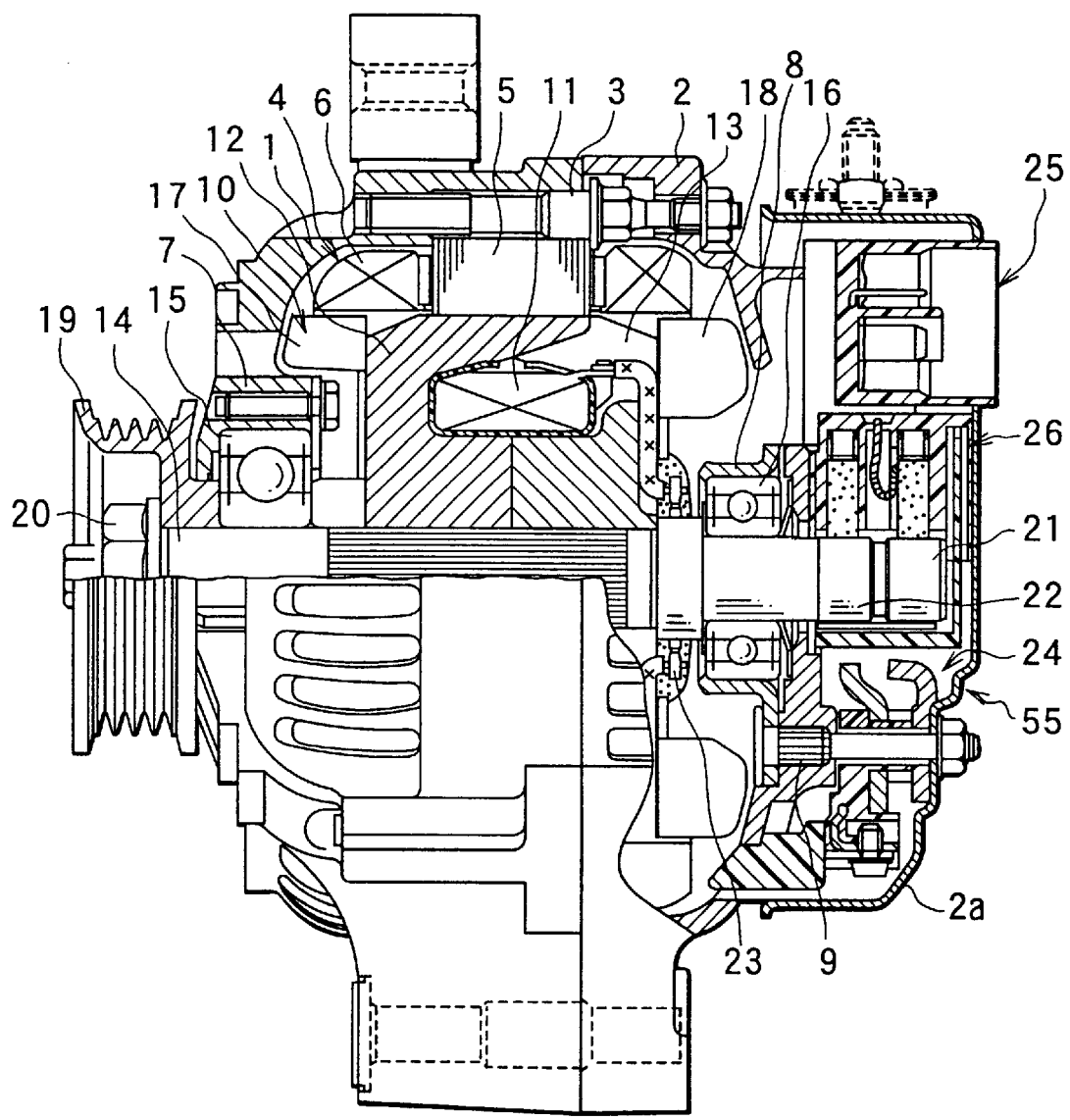
FIG. 1 is a cross-sectional side view of a vehicle AC generator equipped with a feeder arrangement according to a first embodiment of the invention.

A feeder arrangement according to a first embodiment is described with reference to FIGS. 1–7.

An AC generator for a vehicle includes front frame 1, rear frame 2, a plurality of fastening bolts 3, stator 4, rotor 10, front mixed-flow fan 17, rear centrifugal fan 18, a pulley 19, a feeder arrangement including a pair of slip rings 21 and 22 and brush unit 26, a rectifier 24, a voltage regulator 25 and rear cover 27.

Front and rear frames 1 and 2 are fastened by the plurality of fastening bolts 3 to hold stator 4 and rotor 10. Front frame 1 has integrally formed cylindrical bearing box 7, and rear frame 2 has separate steel bearing box 8 which is fixed by a pair of bolts 9. The pair of bolts 9 has serrated outer periphery press-fitted into portions of rear frame 2 around bearing box 8.

Stator 4 is composed of stator core 5 and stator winding 6. Rotor 10 has field coil 11, front pole core 12, rear pole core 13, and rotor shaft 14, and is rotatably supported by a pair of bearings 15 and 16, which are respectively supported by bearing boxes 7 and 8. Front mixed-flow fan 17 is fixed to the front end of front pole core 12 to supply cooling air to both the front coil-ends of stator winding 6 and field coil 11, and rear centrifugal fan 18 is fixed to the rear end of rear pole core 13 to supply cooling air to the rear coil-ends of stator winding 6.

Pulley 19 is fixed to the front end of shaft 14 by nut 20 to be driven by an engine (not shown). The pair of slip rings 21 and 22 is fixed to the rear end of shaft 14 and is connected to field coil 11 by lead wires 23.

Rectifier 24 and voltage regulator 25 are respectively fixed to the rear end of rear frame 2. Brush unit 26 is also fixed to rear frame 2 via foam rubber 58. They are covered by steel rear cover 2a. Rear cover 2a has a plurality of cooling air windows 55 at a circular portion thereof surrounding brush unit 26.

Figure 2:
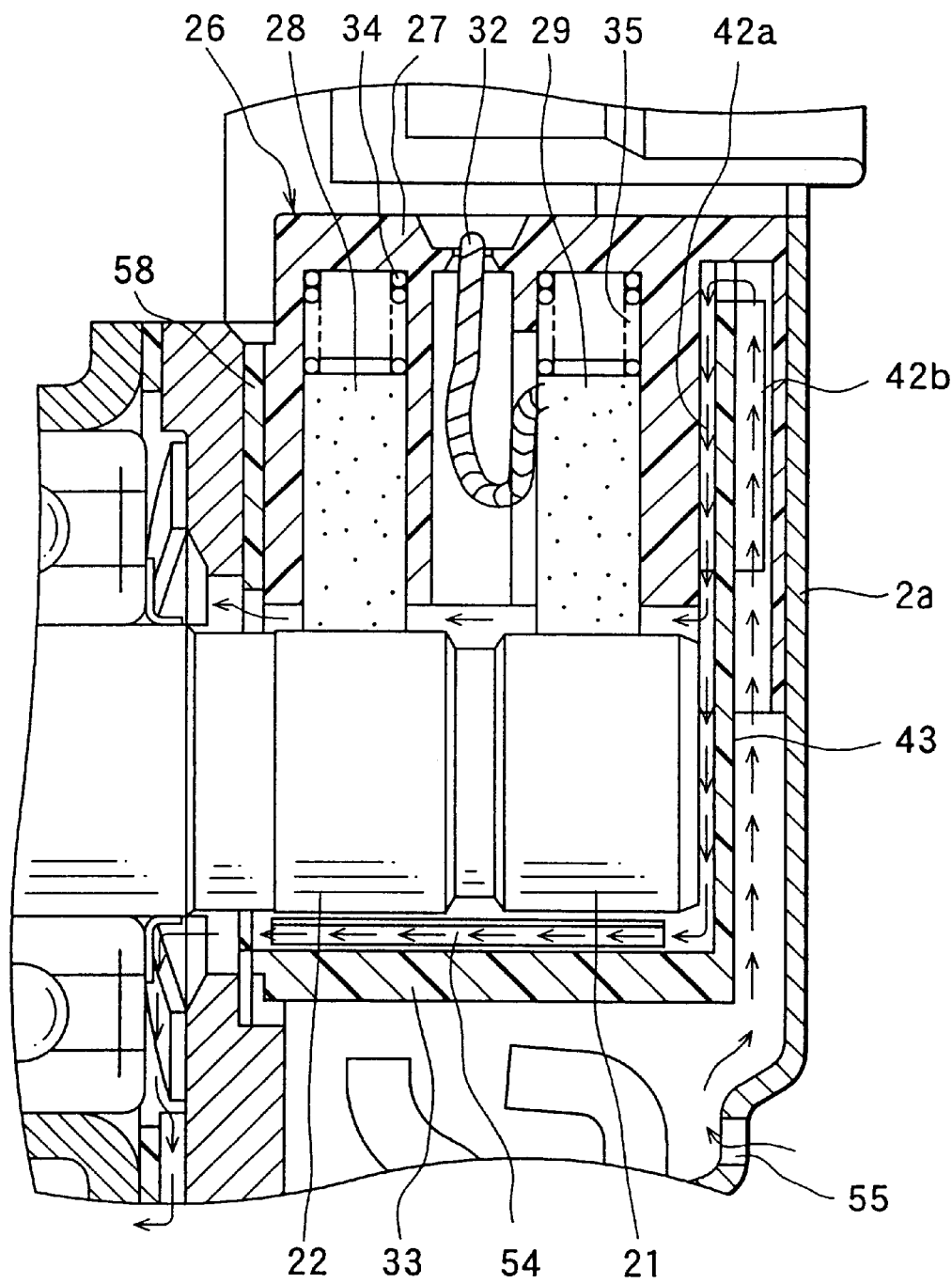
FIG. 2 is a fragmentary sectional view of the feeder arrangement according to the first embodiment.
Figure 3:
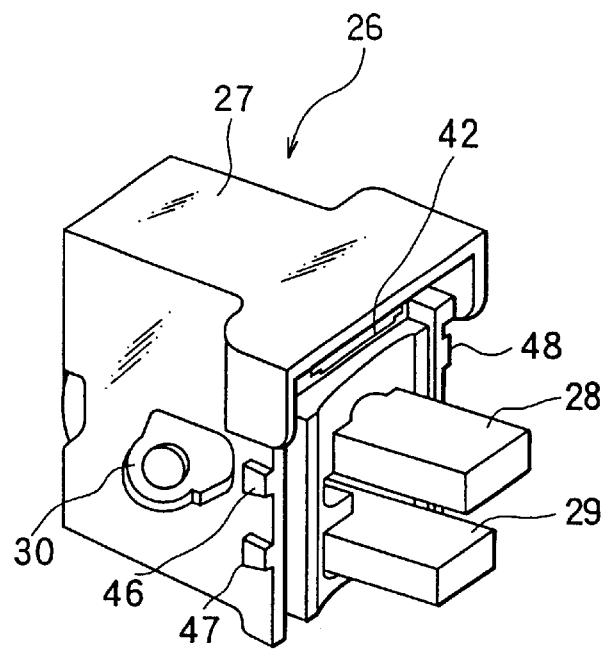
FIG. 3 is a perspective view of a brush holder of the feeder arrangement according to the first embodiment.
Figure 4:
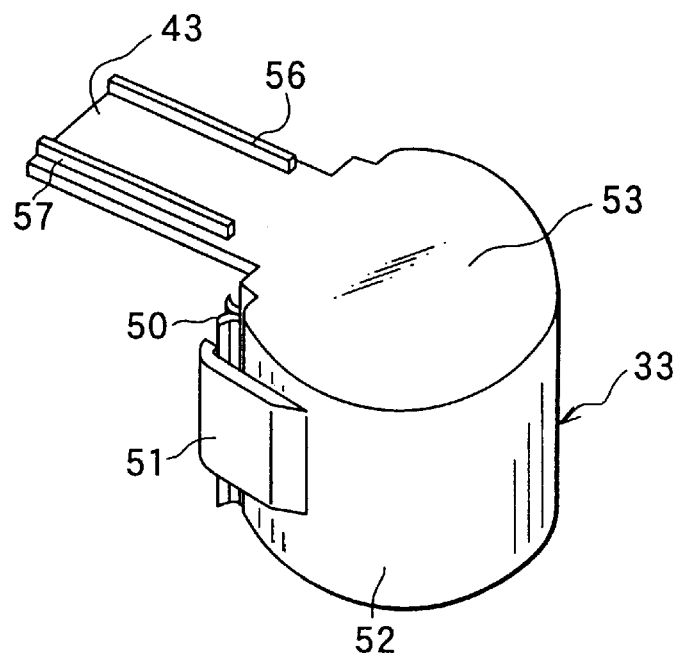
FIG. 4 is a perspective view of a slip-ring cover of the feeder arrangement according to the first embodiment.
Figure 5:
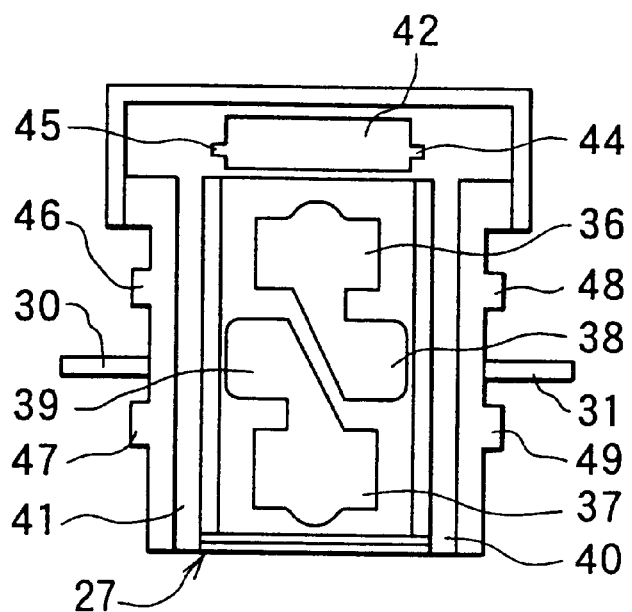
FIG. 5 is a plane view of the brush holder of the brush unit shown in FIG. 3 viewed from a rotor shaft of the AC generator.
Figure 6:
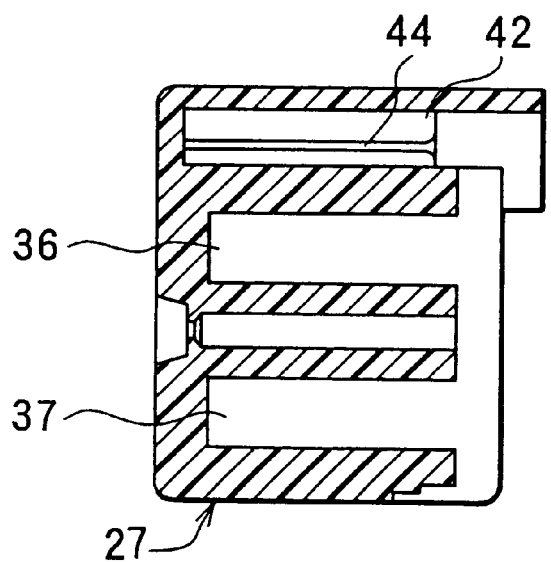
FIG. 6 is a cross-sectional view of the brush holder shown in FIG. 5 cut at the center thereof.
Figure 7:
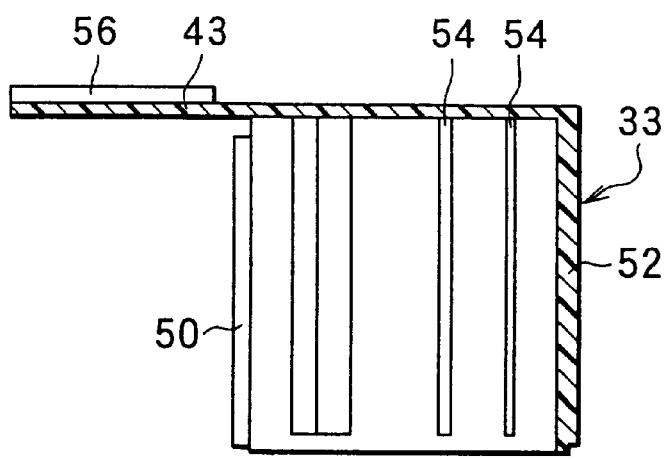
FIG. 7 is a cross-sectional view of the slip-ring cover shown in FIG. 4.

As shown in FIG. 2, brush unit 26 is composed of resin brush holder 27 having a pair of terminals 30 and 31, a pair of brushes 28 and 29 with pig tails 32 respectively soldered to the pair of terminals 30 and 31, resin slip-ring cover 33, and a pair of springs 34 and 35 respectively biasing brushes 28 and 29 against slip rings 21 and 22. Brush holder 27 has a pair of brush compartments 36 and 37, a pair of pig tail compartments 38 and 39, a pair of axial grooves 40 and 41, and flat air chamber 42 extending in parallel with brush compartments 36 and 37. Brush holder 27 also has four projections 46, 47, 48 and 49 at the outer surface thereof. Flat air chamber 42 has an end open to the rear end of shaft 14, the other closed end, and parallel side walls provided with a pair of radial grooves 44 and 45.

Slip-ring cover 33 has a partition 43 which has edges at opposite sides thereof inserted into radial grooves 44 and 45, a pair of radially extending projections 56 and 57, and axially extending V-shaped projection 50 inserted into the pair of axial grooves 40 and 41. Slip-ring cover 33 also has a pair of hooks 51 engaged with four projections 46, 47, 48 and 49 formed at the opposite sides of brush holder 27, cylindrical cover 52 enclosing slip rings 21 and 22, and rear end cover 53.

Partition 43 divides air chamber 42 to form a U-shaped passage composed of series-connected air passages 42a and 42b. Air passage 42a connects to the inside of slip-ring cover 33 near the portion where brushes 28 and 29 are in contact with slip rings 21 and 22, and air passage 42b connects to the outside of slip-ring cover 33.

When rotor 10 rotates, rear centrifugal fan 18 takes in the air at the central portion thereof and discharges the same in the radially outer direction to cool the rear coil-ends of stator winding 6. Accordingly, the air in the inside of slip-ring cover 33 flows out from the cylindrical open-end thereof through gaps formed along bearing box 8 to the fan's central portion, and, in turn, the air at the outside of slip-ring cover 33 is introduced into the inside of brush holder 27 through air passages 42b and 42a as illustrated by arrows in FIG. 2. Thus the air flows along the periphery of slip rings 21 and 22, thereby removing worn powder of the brushes hanging in the circumference.

Air passage 42a is formed narrower than passage 42b to interrupt water or foreign particles. The pair of projections 56 and 57 ensure accurate position, effective seal and sufficient strength of the pair of passages 42a and 42b. Partition 43 can have another pair of projections on the back if necessary. It is possible to provide partition 43 inside brush holder 27 and chamber 42 inside slip-ring cover 33.

Cylindrical cover 52 has a plurality of axially extending projections 54 at the inner periphery thereof to divide worn powder of the brushes into several portions, thereby preventing the worn powder from clinging to the pair of slip rings 21 and 22.

Figure 8:
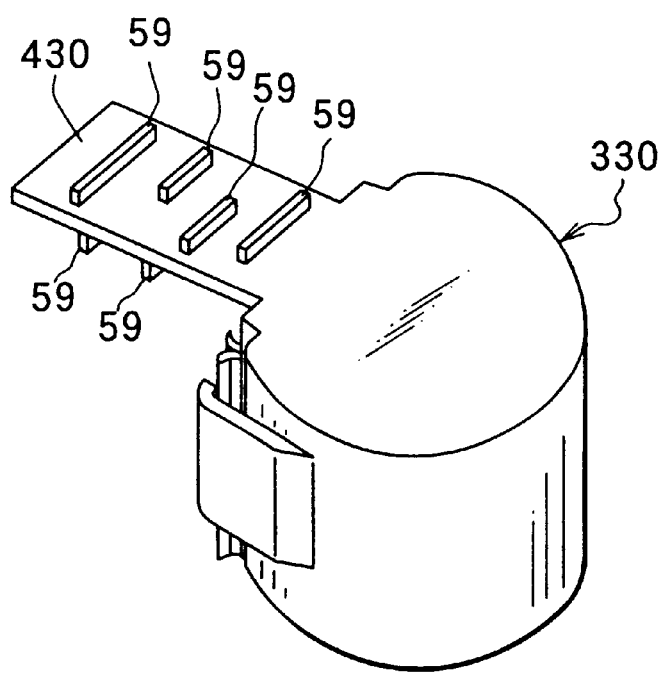
FIG. 8 is a perspective view of a slip-ring cover of a feeder arrangement according to a second embodiment of the invention.

Slip-ring cover 330 of a feeder arrangement according to a second embodiment of the invention is illustrated in FIG. 8. Slip-ring cover 330 has partition 430, which has a plurality of axially extending projections 59 on both surfaces thereof, thereby forming labyrinth to remove water, dust or foreign particles from the air.

Figure 9:
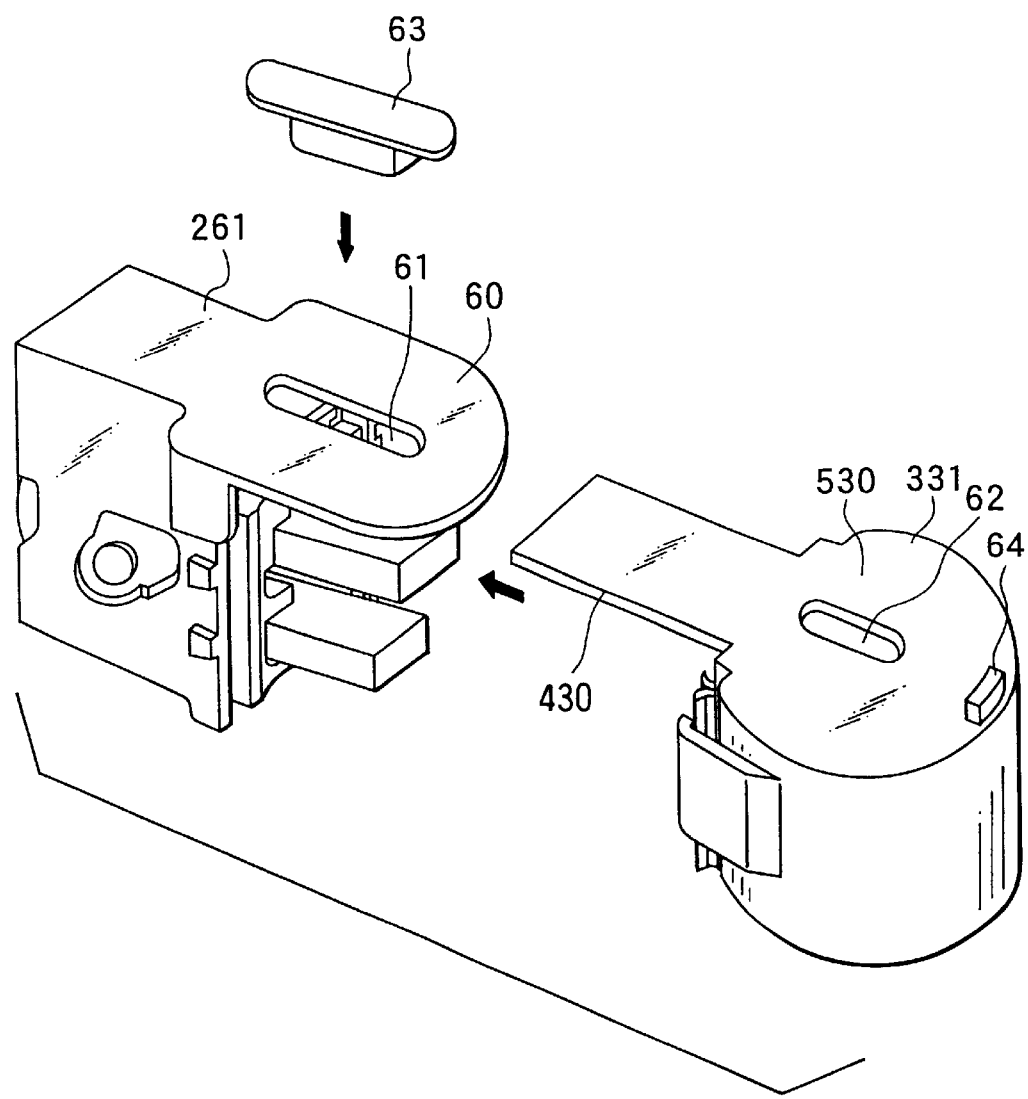
FIG. 9 is an exploded perspective view of a feeder arrangement according to a third embodiment of the invention.
Figure 10:
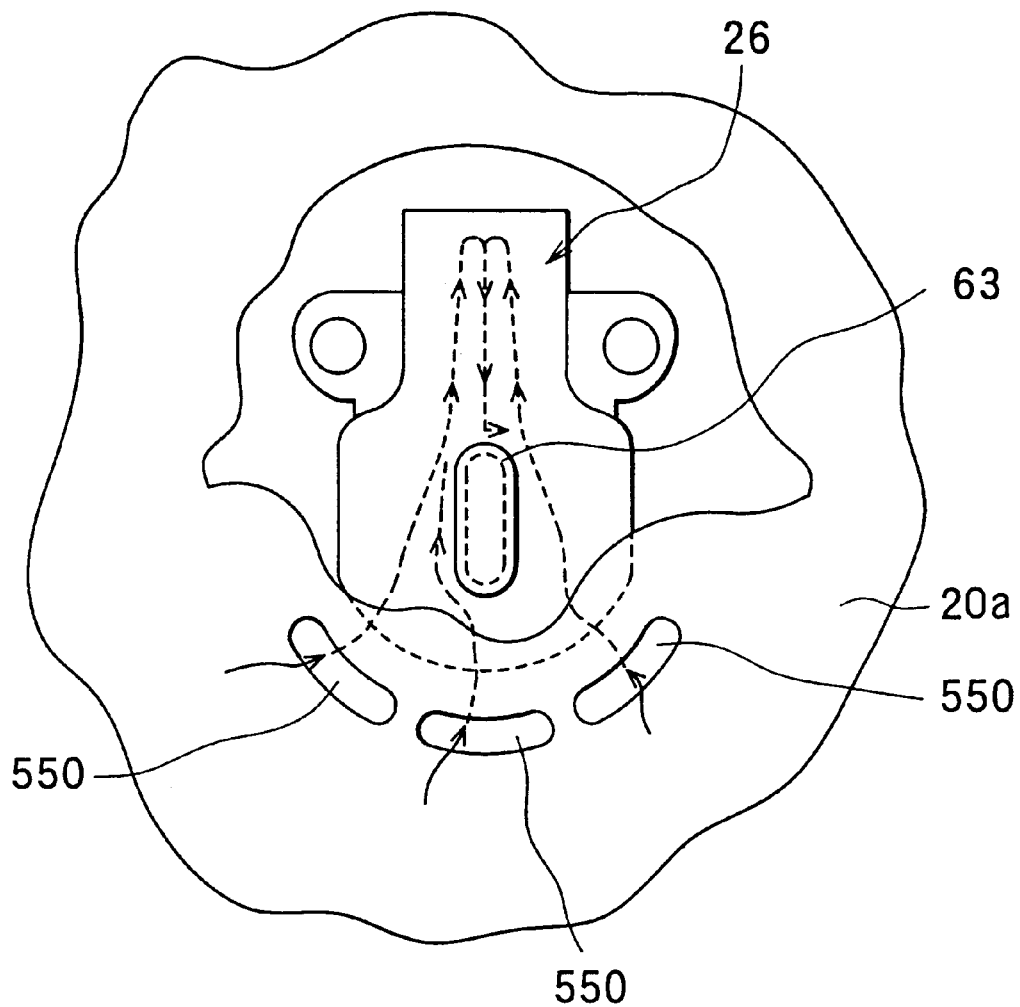
FIG. 10 is a plane view illustrating air flow in the feeder arrangement according to the third embodiment.

A feeder arrangement according to a third embodiment is described with reference to FIGS. 9 and 10.

Brush holder 261 has tongue 60 radially extending from the rear end thereof. Brush holder 261 and slip-ring cover 331 respectively have through holes 61 and 62 at the rear ends thereof to allow a tool to pass therethrough to lift brushes when brush unit 26 is fixed to a portion of rear frame 2 around the pair of slip rings 21 and 22. Through holes 61 and 62 are closed by foam rubber cap 63 thereafter.

Slip-ring cover 331 has arc-shaped spacer 64 on rear-end surface 530 thereof for providing an air passage extending in the radial direction between partition 430 and tongue 60.

Rear cover 20a has three air-intake vents 550, which surround brush unit 26. Accordingly, air flows through the air passage as illustrated by dotted lines in FIG. 10.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A feeder arrangement of an AC generator that includes a stator with a stator winding and a rotor having a field coil and a rotor shaft, said feeder arrangement comprising:

a pair of slip rings fixed to an end of the rotor shaft and connected to the field coil;

a brush unit having a pair of brushes, a brush holder with a pair of brush compartments, and an air chamber extending in parallel with said brush compartment, said air chamber having one end open to a position near said slip rings in contact with said brushes and a second closed end;

a slip-ring cover having a cylindrical portion enclosing said slip rings; and a partition member disposed in said air chamber to divide said air chamber to form a U-shaped air passage wholly in said air chamber, said U-shaped air passage being composed of an air-inlet passage connecting a portion outside said slip ring-cover and an air-outlet passage connecting to said portion near said slip rings inside said slip-ring cover.

2. The feeder arrangement as claimed in claim 1, wherein said air chamber is formed at a portion corresponding to an axial end of said slip rings.

3. The feeder arrangement as claimed in claim 2, wherein said air chamber and said partition member extend in a radial direction of said rotor shaft.

4. The feeder arrangement as claimed in claim 3, wherein said air-outlet passage is narrower than said air-inlet passage.

5. The feeder arrangement as claimed in claim 1, wherein said partition member has a labyrinth member in said U-shaped air passage.

6. A feeder arrangement of an AC generator that includes a stator with a stator winding and a rotor having a field coil and a rotor shaft, said feeder arrangement comprising:

a pair of slip rings fixed to an end of the rotor shaft and connected to the field coil;

a brush unit having a pair of brushes, a brush holder with a pair of brush compartments, and an air chamber open to a position near said slip rings in contact with said brushes;

a slip-ring cover having a cylindrical portion enclosing said slip rings; and a partition member disposed in said air chamber to divide said air chamber to form a U-shaped air passage composed of an air-inlet passage connecting a portion outside said slip-ring cover and an air-outlet passage connecting to said portion near said slip rings inside said slip-ring cover, wherein said air chamber has a pair of grooves for holding said partition member.

7. A feeder arrangement of an AC generator that includes a stator with a stator winding and a rotor having a field coil and a rotor shaft, said feeder arrangement comprising:

a pair of slip rings fixed to an end of the rotor shaft and connected to the field coil; a brush unit having a pair of brushes, a brush holder with a pair of brush compartments, and an air chamber open to a position near said slip rings in contact with said brushes, said brush holder has a tongue covering said slip-ring cover at a fixed distance;

a slip-ring cover having a cylindrical portion enclosing said slip rings; and a partition member disposed in said air chamber to divide said air chamber to form a U-shaped air passage composed of an air-inlet passage connecting a portion outside said slip-ring cover and an air-outlet passage connecting to said portion near said slip rings inside said slip-ring cover.

8. The feeder arrangement as claimed in claim 7 further comprising a spacer disposed between said slip-ring cover and said tongue.

9. A feeder arrangement of an AC generator that includes a stator with a stator winding and a rotor having a field coil and a rotor shaft, said feeder arrangement comprising:

a pair of slip rings fixed to an end of the rotor shaft and connected to the field coil;

a brush unit having a pair of brushes, a brush holder with a pair of brush compartments, and an air chamber open to a position near said slip rings in contact with said brushes;

a slip-ring cover having a cylindrical portion enclosing said slip rings, said slip-ring cover has a through hole for access of a tool to said brushes and a seal member closing said through hole; and a partition member disposed in said air chamber to divide said air chamber to form a U-shaped air passage composed of an air-inlet passage connecting a portion outside said slip-ring cover and an air-outlet passage connecting to said portion near said slip rings inside said slip-ring cover.

10. A feeder arrangement of an AC generator that includes a housing, a stator disposed in said housing and having a stator winding, and a rotor rotatably supported by said housing and having a field coil and a rotor shaft, said feeder arrangement comprising:

a pair of slip rings fixed to an end of said rotor shaft and connected to said field coil;

a brush unit fixed to said housing, said brush unit having a pair of brushes and a brush holder having a pair of brush compartments and an air chamber disposed therein in parallel with said brush compartment, said air chamber having one end open to a position near said slip rings in contact with said brushes and a second closed end; and a slip-ring cover fixed to said housing, said slip-ring cover having a cylindrical portion enclosing said slip rings and a partition member extending from said cylindrical portion to divide said air chamber to thereby form a continuous passage having an air-inlet connecting to a portion outside said slip-ring cover and an air-outlet connecting to said portion near said slip rings inside said slip-ring cover.

11. A feeder arrangement of an AC generator that includes a housing, a stator disposed in said housing and having a stator winding, and a rotor rotatably supported by said housing and having a field coil and a rotor shaft, said feeder arrangement comprising:

a pair of slip rings fixed to an end of said rotor shaft and connected to said field coil;

a pair of brushes; and a cover unit fixed to said housing, said cover unit having a pair of brush compartments, an air chamber disposed in parallel with said brush compartment said air chamber being open to a position near said slip rings in contact with said brushes, a cylindrical member enclosing said slip rings, and a partition member extending from said cylindrical member to divide said air chamber to thereby form a continuous passage having an air-inlet connecting to a portion outside said cylindrical member and an air-outlet connecting to said portion near said slip rings inside said cylindrical member.

* * * * *